United States Patent [19]

Davis et al.

[11] 3,852,392
[45] Dec. 3, 1974

[54] METHOD OF REMOVING PLASTICIZER MIST FROM AIR

[75] Inventors: Willard Parker Davis, Tewksbury; Jerold Julius Golner, Lowell; Sumner Sheldon Feinstein, Peabody, all of Mass.

[73] Assignee: Borden, Inc., Columbus, Ohio

[22] Filed: Dec. 18, 1972

[21] Appl. No.: 316,345

[52] U.S. Cl............... 264/89, 264/37, 264/90, 264/101, 264/210 R, 264/211, 264/237, 425/326 R
[51] Int. Cl............................................ B29d 7/00
[58] Field of Search ......... 264/95, 89, 37, 237, 211, 264/348, 212, 216, 209, 102, 210 R, 90, 101; 425/72, 326 R, 378

[56] References Cited
UNITED STATES PATENTS

| | | | |
|---|---|---|---|
| 2,668,323 | 2/1954 | Johnson | 264/95 |
| 2,698,463 | 1/1955 | Conwell et al. | 264/211 |
| 3,061,876 | 11/1962 | Lloyd et al. | 264/95 |
| 3,331,901 | 7/1967 | Thomas | 264/95 |
| 3,347,962 | 10/1967 | Dieck et al. | 264/102 |
| 3,502,757 | 3/1970 | Spencer | 264/216 |
| 3,544,667 | 12/1970 | Ebert et al. | 264/95 |

Primary Examiner—Jeffery R. Thurlow
Attorney, Agent, or Firm—George P. Maskas; George A. Kap; Donavon L. Favre

[57] ABSTRACT

Hot polyvinyl chloride film is blown in a confined area so as to eliminate escape of plasticizer mist. The plasticizer mist generated is passed through a suitable scrubber, filter or other such known device to remove the plasticizer. The heated air component of the mist, free of plasticizer, is then returned to the process building to recover the heat content, or discharged to the atmosphere as desired.

5 Claims, 2 Drawing Figures

METHOD OF REMOVING PLASTICIZER MIST FROM AIR

BACKGROUND OF THE INVENTION

The mist, which is formed when plasticized polyvinyl chloride film is blown, is collected and removed from the air in which it is contained. The cleansed air is either used to heat the work area or discharged to the outside atmosphere.

The preparation of polyvinyl chloride film by the blown tube method is well known. Polyvinyl chloride is mixed with ingredients such as plasticizers, lubricants and stabilizers in a high intensity mixer. The mixer raises the temperature of the formulation to effect plasticizer absorption and the material is then gravity discharged into cooling blenders. After cooling, the compound is transferred to extruders. The extruders accept the compound through a feed opening, melt the powder-like material and pump the melt through an annular die at approximately 350°–410°F. It is at this point upon leaving the die that the misting of the plasticizer occurs. The relatively high temperature of extrusion coupled with the sudden pressure drop upon emerging from the die causes the plasticizer to flash and atomize from the surface of the molten polymer. The plasticizers normally used in this type of operation are dioctyl phthalate or dioctyl adipate.

After the melt emerges from the die, it is inflated with air and trapped between a pair of squeeze rolls and the die to form a sausage-like balloon of inflated plastic. Simultaneously, upon emerging from the die, the mist is impinged with cooling air to set further expansion. It is in this tower area which houses the upper nip roll system and the bubble guide mechanisms where the existing plasticizer mist exhaust system is normally located.

After the inflated bubble has been collapsed to a web by the nip rolls, the web is returned to floor level where it is slit, separated and eventually wound into finished customer size rolls. The rolls of film are then boxed, palletized and placed in warehouse racks for eventual distribution to supermarkets and other establishments where the film is used for the wrapping of food products such as meat and produce.

The die where the misting occurs is usually exposed and some of the mist escapes to the work area. Most of the mist is drawn into the tower area and discharged through a mist exhaust system to the atmosphere. The mist is oily, has an unpleasant odor and causes an unpleasant environment both within the work area and in the neighborhood surrounding the polyvinyl chloride film manufacturing facilities.

When the mist is drawn into the tower area by the exhaust system, large quantities of air are drawn into the tower with the mist. There are systems available for removing the mist from the air such as scrubbers, burners and filters. Due to the large quantity of air drawn into the tower area by the exhaust system, the cost of the removal systems is either very high or the efficiency of the removal system is very low.

There are completely closed systems for producing thermoplastic tubing. These systems involve passing the cooling air over the film bubble which is formed, collecting the cooling air which has been heated, refrigerating the air and then reusing it for cooling. The process wherein the heated air is cooled and recycled is shown for example in U.S. Pat. No. 3,061,876 of Lloyd (1962). The closed system is much like the above described open system in all other respects but causes an undesirable accumulation of plasticizer on the cooling coil.

SUMMARY OF THE INVENTION

The plasticizer mist which is generated in the production of blown plasticized polyvinyl chloride film is confined to an enclosed space surrounding the blown film. The plasticizer mist is removed from the air in which it is suspended. The air which has been heated by the film and cleansed by mist removal is either directed into the work area or discharged to the atmosphere. By enclosing the immediate area in which the film is blown, the escape of the plasticizer mist to the work area is eliminated and the volume of air which must be processed is significantly decreased. By directing the heated and cleansed air to the work area, the heating requirements for the work area can be at least partially provided. By using the hot cleansed air for heating purposes instead of refrigerating and reusing it, the refrigeration requirements for providing cooling air to cool the film is greatly reduced.

DESCRIPTION OF THE PREFERRED EMBODIMENTS

Figures 1, 2:
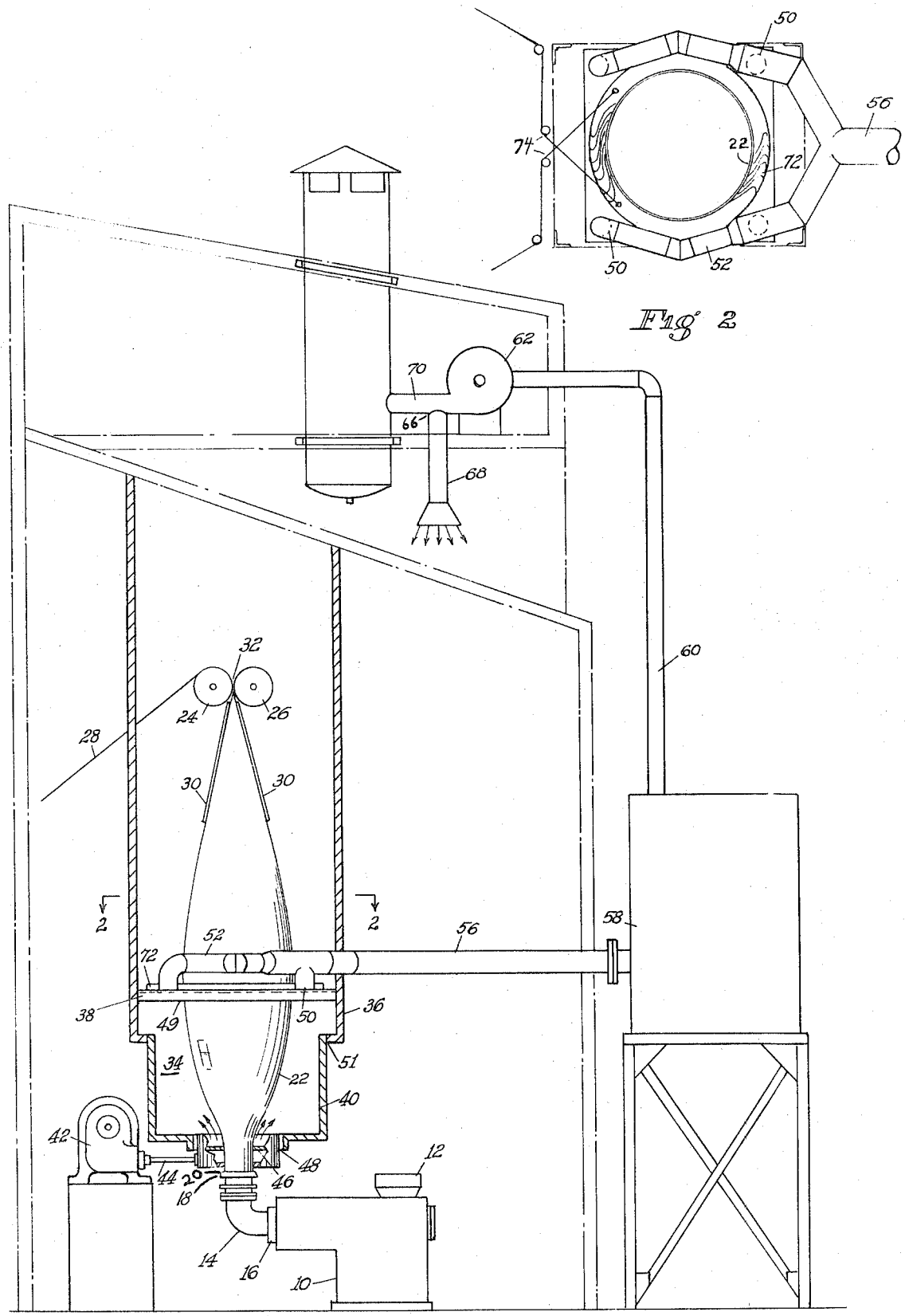
FIG. 1 is a side elevation partly in section of one form of the mist removal system installed in a tubular film extruding apparatus.
FIG. 2 is a sectional view taken along lines 2—2 of FIG. 1.

In the drawings which are referred to immediately below, like reference numerals designate like parts except where otherwise indicated.

The reference numeral 10 designates a conventional extruder, commonly used in the manufacture of polyvinyl chloride film. Polyvinyl chloride in pellet or powder form is fed into the feed hopper 12 located at one end of the extruder. The polyvinyl chloride is then fed through the extruder and heated therein until it reaches its formative plastic state and in such condition fed into a 90° elbow 14 approximately secured to the head end 16 of the extruder 10. A die, generally designated by the reference numeral 18, is provided with an annular orifice 20 from which the molten mass of polyvinyl chloride merges as a hot viscous thermoplastic tubing 22. It is here that the misting of the plasticizer takes place.

The die 18 is connected to an air supply whereby air is introduced interiorly of the tubing to inflate the same. The air supply is provided with a valve not shown, so that when the desired quantity of the air has been introduced within the tubing, further supply thereof can be prevented. In the event the quantity of air within the tubing decreases, as for example, by leakage or otherwise, the requisite amount of air can be added by proper manipulation of the valve.

The extruded and the inflated tubing mechanism and their application to polyvinyl chloride and widely known in the art and are, therefore, not described in detail here.

The inflated tubing 22, which generates plasticizer mist upon emerging from orifice 20, is withdrawn upwardly from the die orifice 20 in a substantially vertical direction by a pair of counter rotatable nip rolls 24 and 26 disposed in spaced relationship above the die 18. These nip rolls are rotatably mounted with the peripheral speed of the rolls 24 and 26 being preferably adjusted to stretch the tubing while it is in the formative plastic state.

The rolls 24 and 26 also serve to collapse the tubing passing there between into a flattened, ribbon-like material 28 which is wound up on a wind-up reel not shown.

Assisting the rolls 24 and 26 in flattening the tubing 22 are converging guide means intermediate to die 18 and the rolls 24 and 26. The guide means comprises collapsor plates 30 which contact the tubing 22 after it has been inflated to its predetermined final diameter and which are arranged in an inverted V-shape to form a converging path of the nip point 32 of the rolls 24 and 26.

It is to be noted that the inflating medium which is entrapped between the nip point 32 of the rolls 24 and 26 and the die 18 constitutes an isolated air bubble which remains substantially stationary while the tubing advances from the die 18 through the collapsor plates 30 to the nip 32.

An area 34 has been set up consisting of the housing 36, plenum 38, ower enclosure 40 and iris 72. This is the area in which all of the generated plasticizer mist is confined. This confined area 34 prevents the escape of the mist to the surrounding process area outside of the confined area 34. The housing 36, plenum 38 and lower enclosure 40 also serves to eliminate the entrance of larger amounts of air into the tubing forming area 34 thus decreasing the amount of mist laden air to be cleansed. The confined area is maintained at a pressure less than atmospheric by an exhaust system to be discussed later. The subatmospheric pressure prevents plasticizer mist from passing to the atmosphere through small openings in the confined area.

The hot viscous thermoplastic tubing 22 as it leaves die 18 of the extruder 10 is cooled by a stream of refrigerated air. The air is refrigerated by cooling means 42 which can be of any conventional type for chilling air. The air is usually chilled to about 60°F. in cooling means 42 conveyed through conduit 44 to an annular air ring 46.

The annular air ring 46 encircles the die 18 at its discharge end and projects into the lower enclosure 40 through an opening 48. The opening 48 allows the annular air ring 46 and the die 18 to be easily removed and inserted into enclosure 40. The opening 48 can either be such as to provide a tight fit with air ring 46 or preferably an opening providing a gap of from ¼ to 3 inches. This width prevents an undue amount of air from entering the confined area, allows easy removal of air ring 46 and die 18 and prevents a fluctuating pressure in the confined area.

Air discharge from the air ring 46 becomes laden with plasticizer mist by contact with the hot tubing 22 and such mist is continuously exhausted from chamber 34 through four exhaust ports 50 located in plenum 38.

The hot (120°F. to 160°F.) plasticizer mist laden air which enters ports 50 passes through exhaust ducts 52 thence to main duct 56. The main duct 56 carries the mist laden air to the mist removal system 58. The mist removal system may be any of those conventionally used such as an incinerator, electrostatic precipitator, scrubber, centrifuge, impingement device or other suitable mechanical filter. The systems for removing the plasticizer mist from air are widely known in the art, and, therefore, will not be described in detail here. The cleansed air leaves the mist removal system 58 through duct 60 to blower 62 thence through duct 70 to control point 66. At control point 66, the cleansed air may be diverted to the process work area through duct 68 or through duct 70 to the outside of the process building.

An iris diaphram 72 is mounted on top of plenum 38 to control the quantity of air drawn into chamber 34 from around the periphery of tubing 22. A quantity of air is required at iris diaphram 72 to prevent escape of the plasticizer mist carried along with the cooled tubing in its passage upward to collapsor plates 30. Iris diaphram 72 is an adjustable diaphram of thin plates that can be turned by an adjusting mechanism generally shown at 74 so as to change the diameter of the central opening. The iris diaphram 72 mechanically operates like the conventional iris diaphram in a camera does to regulate the light opening behind the lens of the camera. The central opening is preferably adjusted to provide an air space of from ¼ to 3 inches between the iris diaphram 72 and the inflated tubing 22. An air space of less than ¼ inches between the iris diaphram 72 and the tubing 22 often creates a problem of pulsating air pressure in the chamber in which the tubing 22 is formed. The pulsations result in undesirable variations in the size and thickness of tubing 22. An air space of greater than three inches is undesirable in that it allows a larger amount of air to be drawn into the tubing forming area 34. The air space dimensions given refer to the commercial film forming unit now generally used.

The lower enclosure 40 can be removed in part from the extruder 10 with relative ease. When the movable portion 40 is in its normal operating position, it encircles air ring 46, and provides a tight fit with upper tower enclosure 36. In a preferred embodiment, an annular air opening 51 provides a space of approximately ¼ inch to ½ inch in width between the top of enclosure 40 and the bottom of enclosure 36 through which a controlled amount of clean air passes to form an air seal against plasticizer mist leakage into the process work area.

Film systems for which the present invention is applicable include the polyvinyl chloride films which contain plasticizers and/or other additives. The term polyvinyl chloride includes copolymers of polyvinyl chloride and mixtures of polyvinyl chloride with the other polymers. For example, the polyvinyl chloride can be a copolymer of polyvinyl chloride and polyvinyl acetate or mixtures of polyvinyl chloride with other homopolymers such as polyvinyl acetate. Other copolymers of polyvinyl chloride included in the definition of polyvinyl chloride are the copolymers of polyvinyl chloride with $C_1$-$C_8$ alkyl esters of alpha-unsaturated aliphatic acids having 3–5 carbon atoms to the molecule of said acid. Examples of the alkyl esters include methyl, ethyl and octyl acrylate and methacrylate.

The plasticizers are generally present in the proportion of up to 60 parts by weight per 100 parts of the polyvinyl chloride. The plasticizers preferably are di (2-ethylhexyl) adipate or di (2-ethylhexyl) phthalate. Other plasticizers which can be used include acetyl tributyl citrate, epoxidized soybean oil, butyl phthalyl butyl glycolate, diisobutyl adipate, butyl benzyl phthalate and mixtures thereof.

Other additives to the film compositions may include the usual stabilizers for polyvinyl chloride film such as, for example, triphenyl phosphate, nonylphenol, barium, calcium and zinc salts of lauric and other fatty acids and mixtures thereof. As the components which are commonly present in polyvinyl chloride films are well known in the art, they will not be described in detail in the present application. Reference is, however, made to U.S. Pat. No. 3,479,308 of Gattenby, etal, for disclosure of materials which can be present in the polyvinyl chloride film.

The details and manner of practicing the invention will be apparent from the following examples, it being understood that the examples are illustrative thereof and that the scope of the invention is not restricted thereto other than as set forth in the appended claims.

EXAMPLE 1

A continuous length of polyvinyl chloride tubing 22 was prepared from 100 parts of a polyvinyl chloride resin plasticized with 30 parts of dioctyl phthalate. The plasticized polyvinyl chloride was extruded from an extruder of the type shown in FIG. 1 in a formative plastic state through an annular orifice die. The temperature of the polyvinyl chloride at the die being approximately 400°F.

The extruded tubing 22 was withdrawn upwardly within the cooling chamber 40 of the housing 36 in a vertical direction from the die by the nip rolls 24 and 26 positioned about 25 feet above the die. Sufficient air to inflate the tubing while in the plastic formative state to a final diameter of 30 inches was introduced interiorly of the tubing. The tubing was withdrawn through the annular air ring 46 which extended into the cooling chamber and was positioned in close proximity to the die so that the chilled air issuing from the air ring impinged on the tubing immediately upon exiting the die. The amount of impinging air was 600 cubic feet per minute. The input temperature of the impinging air was 60°F. The mist was generated at the exit of the die. The mist consisted of dioctyl phthalate and was carried by a 1,200 cubic feet per minute exhaust air stream through the confined area 34 to the outlet ducts. The air stream was diluted at the top of the confined area 34 by air entering through the control gap 49 between the iris 72 and the bubble 22. The iris 72 was adjusted to a 34 inch opening providing a two-inch gap, allowing 300 cubic feet per minute to enter. An additional 300 cubic feet per minute was allowed to enter through at a 2-inch gap 48. The temperature of the mist-laden air exhausting from confined area 34 was 120°F. The 1,200 cubic feet per minute mist-laden air was then passed to a mist removal system 58 prior to discharge.

EXAMPLE II

A continuous length of polyvinyl chloride tubing 22 was prepared from 100 parts of a polyvinyl chloride resin plasticized with 35 parts of di (2-ethylhexyl) adipate. The plasticized polyvinyl chloride was extruded from an extruder of the type shown in FIG. 1 in a formative plastic state through an annular orifice die. The temperature of the polyvinyl chloride at the die being approximately 390°F.

The extruded tubing 22 was withdrawn upwardly within the cooling chamber 40 of the housing 36 in a vertical direction from the die by the nip rolls 24 and 26 positioned about 25 feet above the die. Sufficient air to inflate the tubing while in the plastic formative state to a final diameter of 35 inches was introduced interiorly of the tubing. The tubing was withdrawn through the annular air ring 46 which extended into the cooling chamber and was positioned in close proximity to the die so that the chilled air issuing from the air ring impinged on the tubing immediately upon exiting from the die. The amount of impinging air was 650 cubic feet per minute. The input temperature of the impinging air was 60°F. The mist was generated at the exit of the die. The mist consisted of di (2-ethylhexyl) adipate and was carried by a 1,350 cubic feet per minute exhaust air stream through the confined area 34 to the outlet ducts. The air stream was diluted at the top of the confined area 34 by air entering through the control gap 49 between the iris 72 and the bubble 22. The iris was adjusted to a 39 inch opening providing a 2-inch gap, allowing 350 cubic feet per minute to enter. An additional 350 cubic feet per minute was allowed to enter through at a 2 inch gap 48. The temperature of the mist-laden air exhausting from the confined area 34 was 120°F. The 1,350 cubic feet per minute mist-laden air was then passed to a mist removal system 58 prior to discharge.

EXAMPLE III

A continuous length of polyvinyl chloride tubing 22 was prepared from 100 parts of a polyvinyl chloride resin plasticized with 35 parts of di (2-ethylhexyl) adipate. The plasticized polyvinyl chloride was extruded from an extruder of the type shown in FIG. 1 in a formative plastic state through an annular orifice die. The temperature of the polyvinyl chloride at the die being approximately 390°F.

The extruded tubing 22 was withdrawn upwardly within the cooling chamber 40 of the housing 36 in a vertical direction from the die by the nip rolls 24 and 26 positioned about 25 feet above the die. Sufficient air to inflate the tubing while in the plastic formative state to a final diameter of 25 inches was introduced interiorly of the tubing. The tubing was withdrawn through the annular air ring 46 which extended into the cooling chamber and was positioned in close proximity to the die so that the chilled air issuing from the air ring impinged on the tubing immediately upon exiting the die. The amount of impinging air was 500 cubic feet per minute. The input temperature of the impinging air was 60°F. The mist was generated at the exit of the die. The mist consisted of di (2-ethylhexyl) adipate and was carried by a 1,000 cubic feet per minute exhaust air stream through the confined area 34 to the outlet ducts. The air stream was diluted at the top of the confined area 34 by air entering through the control gap 49 between the iris 72 and the bubble 22. The iris was adjusted to a 29-inch opening providing a 2-inch gap, allowing 250 cubic feet per minute to enter. An additional 250 cubic feet per minute was allowed to enter at a 2-inch gap 48. The temperature of the mist-laden air exhausting from confined area 34 was 120°F. The 1,000 cubic feet per minute mist-laden air was then passed to a mist removal system 58 prior to discharge.

We claim:

1. In a blown tube method for making plasticized polyvinyl chloride film wherein molten plasticized thermoplastic is extruded in the form of a seamless tubing with the tubing being flattened at a point spaced from the point of extrusion and inflated to a predetermined diameter intermediate the point of extrusion and the point of the tubing where plasticizer mist is no longer released in any substantial quantity from the surface of the film; the exterior surface of tubing being wholly enveloped in the vicinity of the point of extrusion with a cooling medium of chilled gas, the chilled gas circulated through the enclosure such that the chilled gas wholly envelopes the exterior surface of the molten plastic being extruded to cool the plastic to its solidification point and to pick up plasticizer mist being generated, the cooling gas containing plasticizer mist passed to a mist removal device, the mist removed and the cooling gas discharged from the mist removal device to the atmosphere outside of the enclosure, wherein the improvement comprises adjusting an iris diaphragm opening surrounding the inflated extruded seamless tubing at a point of the tubing where plasticizer mist is no longer released in any substantial quantity from the surface of the film to provide an opening from ¼ to 3 inches between the inner edge of the iris diaphragm and the outer edge of the tubing passing through the iris diaphragm.

2. The method of claim 1, wherein the confined area is maintained at subatmospheric pressure.

3. The method of claim 2, wherein sufficient air is allowed to enter the confined area from the atmosphere to prevent substantial pressure fluctuations.

4. The method of claim 3, wherein air is allowed to enter the confined area through an opening surrounding the source of the cooling medium of chilled gas.

5. The method of claim 4, wherein the opening has a width of from ¼th to 3 inches.

* * * * *

UNITED STATES PATENT OFFICE
CERTIFICATE OF CORRECTION

Patent No. 3,852,392                    Dated December 3, 1974

Inventor(s) Willard P. Davis, Jerold J. Golner, Sumner S. Feinstein

It is certified that error appears in the above-identified patent and that said Letters Patent are hereby corrected as shown below:

Column 2, line 62 "and" should read --are--
Column 3, line 26 "ower" should read --lower--

Signed and sealed this 18th day of February 1975.

(SEAL)
Attest:

RUTH C. MASON
Attesting Officer

C. MARSHALL DANN
Commissioner of Patents
and Trademarks